No. 741,449. PATENTED OCT. 13, 1903.
J. BRANDSTETTER.
TOOL HOLDER FOR LATHES OR PLANERS.
APPLICATION FILED JUNE 12, 1903.
NO MODEL.

WITNESSES:
H. Walker
Wm. T. Patton

INVENTOR
Joseph Brandstetter
BY
ATTORNEYS.

No. 741,449.

Patented October 13, 1903.

UNITED STATES PATENT OFFICE.

JOSEPH BRANDSTETTER, OF SALEM, OHIO.

TOOL-HOLDER FOR LATHES OR PLANERS.

SPECIFICATION forming part of Letters Patent No. 741,449, dated October 13, 1903.

Application filed June 12, 1903. Serial No. 161,195. (No model.)

*To all whom it may concern:*

Be it known that I, JOSEPH BRANDSTETTER, a subject of the Emperor of Austria-Hungary, and a resident of Salem, in the county of Columbiana and State of Ohio, have invented a new and Improved Tool-Holder for Lathes or Planers, of which the following is a full, clear, and exact description.

This invention has for its object to provide novel simple details of construction for a tool-holder that may be employed for the support of a cutting-tool used on a lathe, planer, shaper, or slotting-machine and enable the proper adjustment of the cutting-tool for height and also adapt the tool-holder to afford resilience or render said support rigid, as the nature of the work may require.

The invention consists in the novel construction and combination of parts, as is hereinafter described, and defined in the appended claims.

Reference is to be had to the accompanying drawings, forming a part of this specification, in which similar characters of reference indicate corresponding parts in both the figures.

Figure 1:
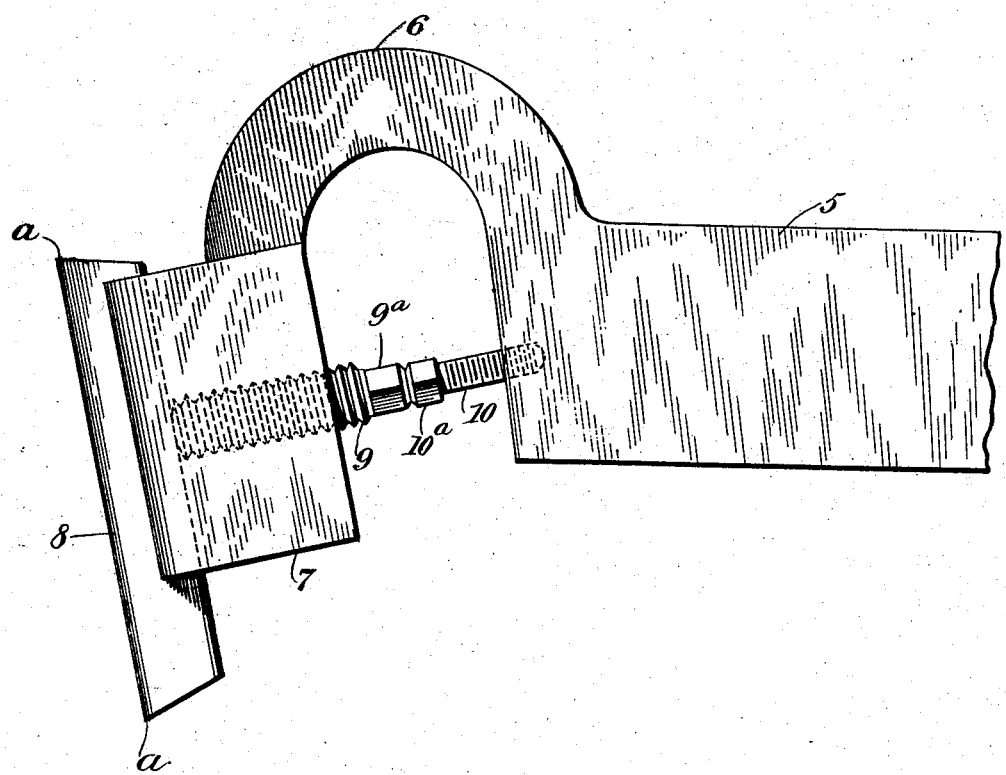
Figure 2:
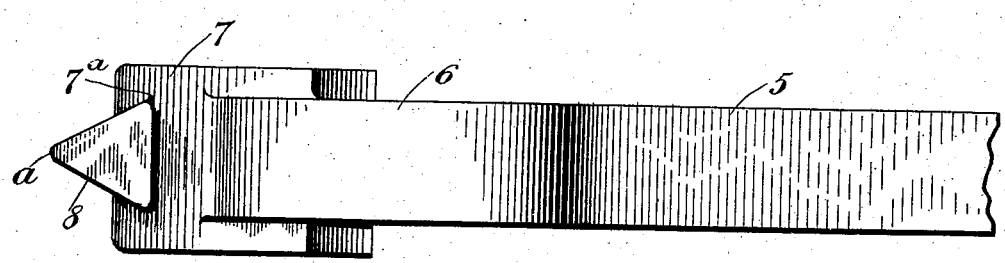

Figure 1 is a partial side view of the improved tool-holder, and Fig. 2 is a partial plan view of the same.

For certain kinds of work done on machine lathes and planers it is found advantageous to give a slight degree of resilience to the tool; but for general work when heavy cutting is necessary the tool must be held rigid and the cutting edge presented at a correct angle to the material to be cut. Usually spring-cutters are forged from bars of steel and are expensive. My improved tool-holder enables the holding of the cutting-tool rigidly or in a manner that will afford slight resilience thereto, the change being effected quickly and in a reliable manner, as is hereinafter described.

The tool-holder mainly comprises a bar 5, preferably of steel, rectangular in cross-section and of suitable length for effective service. Upon one end of the bar 5 a spring-head is integrally formed, consisting of the arched member 6, that at its depending free end merges into a holder-box 7. The head portion 6 is arched, so as to project above the normal upper edge of the bar 5, and is so proportioned in its body as to spring slightly at the free end under strain applied upon the holder-box 7. As shown, the holder-box comprises an essentially rectangular block-like formation that depends from the free end of the arched head 6 and may with advantage incline somewhat downward and rearward, as indicated in Fig. 1. In the front face or side of the holder-box 7 a tool-receiving channel $7^a$ is formed, that is undercut in its side walls, thus forming a longitudinal dovetail groove at the transverse center of the box. The tool 8, that is to engage within the channel $7^a$, is in the form of a triangular bar of fine steel of a suitable length and such other dimensions as adapt it to fit loosely within the channel $7^a$, the sides of which embrace two corners of the tool and portions of the opposite side walls of the same, the angular corners $a$ projecting away from the box. Opposite the rear wall of the channel $7^a$ and near the longitudinal center of the holder-box a threaded perforation is formed in the body of said box, this perforation that intersects said rear wall of the channel being disposed at a right angle thereto.

A set-screw bolt 9 is fitted into the threaded perforation in the holder-box 7 and projects rearwardly a short distance, having an angular head $9^a$ on its rear end for the accommodation of a suitable wrench, by the use of which the set-screw bolt may be forced against the body of the cutting-tool 8 and secure it at any desired point of elevation in the holder-box channel $7^a$. In the end wall of the holder-bar 5, directly opposite the head of the set-screw bolt 9, a threaded perforation is formed, and in said perforation a jam-screw bolt 10 is fitted, this screw-bolt having a head $10^a$, that may be forcibly impinged upon the head $9^a$ of the set-screw bolt 9.

It will be seen that when the jam-screw bolt 10 is forced against the set-screw bolt 9 there can be no resilient action of the tool carried in the tool-holding box 7, as the bolts 9 10 serve as a stiffening-brace and convert the tool-holder into a rigid bar. The tool 8 is sloped at each end, so as to give the angular corners $a$ the proper inclination for effective service as the cutting-nose of the tool, and obviously any desired pitch or slope from the point rearward or laterally may be given to the tool to shear cut metal when used on a lathe, shaper, planer, or slotting-machine, the different kinds of work done on these machines requiring changes in the cutting edges of the tool.

It will be seen that the nose of the tool 8 may be given such an angular formation as will adapt it for use in cutting standard screw-threads on an engine-lathe.

As a number of tools 8 may be provided for interchangable use in the holder-box 7, all kinds of work may be done on a variety of power-driven machine-tools by utilizing the improved tool-holder that may be adapted to fit the tool-stocks of such machines.

Having thus described my invention, I claim as new and desire to secure by Letters Patent—

1. A tool-holder comprising a body portion, a spring-head portion, a holder-box on the spring-head and having an undercut channel in its front face, a set-screw bolt intersecting the rear wall of the channel, and a jam-screw bolt adapted to impinge upon the set-screw bolt so as to render the spring-head rigid.

2. A tool-holder comprising an elongated rectangular body portion, an arched resilient head portion extended from one end of the body portion, a holder-box depending from the free end of the spring-head and inclining rearward and downward, said box having an undercut channel in its front face, a set-screw bolt tapping the bottom wall of said channel, and a jam-screw bolt adjustable in the front end of the body portion and adapted to impinge upon the rear end of the set-screw bolt.

In testimony whereof I have signed my name to this specification in the presence of two subscribing witnesses.

JOSEPH BRANDSTETTER.

Witnesses:
 FRANK MERCER,
 HENRY MERLINGER.